United States Patent [19]

Osterhoudt, III et al.

[11] Patent Number: 4,611,664

[45] Date of Patent: Sep. 16, 1986

[54] TECHNIQUE FOR PLACING A LIQUID CHEMICAL IN A WELL OR BORE HOLE

[75] Inventors: M. Glenn Osterhoudt, III; Vernon L. Green, both of Corpus Christi, Tex.

[73] Assignee: Petro-Stix, Inc., Corpus Christi, Tex.

[21] Appl. No.: 697,123

[22] Filed: Jan. 31, 1985

[51] Int. Cl.⁴ .................. E21B 37/06; B65D 85/84
[52] U.S. Cl. ................................. 166/902; 166/310; 166/371; 166/162; 206/524.7
[58] Field of Search ............ 166/244 C, 311, 310, 166/285, 312, 292, 293, 300, 304, 69, 162, 117, 902, 371, 376, 63; 206/524.7; 252/90

[56] References Cited

U.S. PATENT DOCUMENTS

| | | | |
|---|---|---|---|
| 2,251,080 | 7/1941 | Taber | 252/90 |
| 2,366,373 | 1/1945 | Voorhees | 166/300 |
| 2,635,996 | 3/1951 | Rohrback et al. | 206/524.7 |
| 2,748,867 | 6/1956 | Lissant | 206/524.7 |
| 2,775,302 | 12/1956 | Kirkpatrick | 166/310 |
| 2,804,150 | 8/1957 | Fuson | 166/311 |
| 3,141,513 | 7/1964 | Davis | 175/72 |
| 3,164,206 | 1/1965 | Sharp | 166/312 |
| 4,086,066 | 4/1978 | McDermott | 206/524.7 |

Primary Examiner—Stephen J. Novosad
Assistant Examiner—Bruce M. Kisliuk
Attorney, Agent, or Firm—G. Turner Moller

[57] ABSTRACT

A liquid chemical, such as a corrosion inhibitor, is inserted into a producing well by pouring the chemical into an elongate carrier and then dropping the carrier into the well. The liquid chemical and the carrier are selected so that the carrier is dissolved by the chemical. The chemical is therefore delivered into the well toward the bottom thereof where it is desired to place the chemical.

17 Claims, 3 Drawing Figures

TECHNIQUE FOR PLACING A LIQUID CHEMICAL IN A WELL OR BORE HOLE

This invention relates to a technique for delivering a liquid chemical into a producing oil or gas well, an injection well or a bore hole.

There are a variety of situations which occur in the oil field in which it is desirable to inject or deliver a chemical into a well or bore hole. The most common situation is probably the dropping of soap sticks into a gas well which has loaded up. In this situation, a surfactant is delivered into the well and agitated to create a foam which is produced to the atmosphere thereby unloading the well and making it capable of producing gas against the back pressure of a compressor or gathering system At present, soap sticks are available in two general types. In the first type, the soap material is a solid and is molded to comprise an elongate rod shaped member which is dropped into the well. The other technique incorporates the use of a water soluble carrier into which the liquid soap material is placed at a plant or filling facility. These liquid filled soap sticks travel through ordinary channels of commerce, are bought by the well operator and the gauger drops the sticks into the well. The water in the well dissolves the carrier thereby releasing the liquid soap to create the foam.

Another common situation where it is desired to deliver a chemical into a well involves chemicals which create a corrosion inhibiting film on metal components in the well. Corrosion inhibitors are effective because they produce a film which separates the metals under attack from corrosive well fluids which may be gaseous, liquid or of mixed phase.

At present, corrosion inhibiting chemicals are delivered into a well in a variety of techniques. In one technique, a separate string of tubing is placed in the well so that a liquid corrosion inhibiting chemical may be injected into the bottom thereof as desired. In another technique, a liquid chemical is injected down the main production string merely by pumping it, in sufficient quantity, down the tubing string. In another technique, a liquid corrosion inhibiting material is simply poured into the tree with the lower master valve closed and the upper master valve open. The upper master valve is then closed and the lower master valve opened to allow the liquid material to run down the inside of the tubing. In another technique, the corrosion inhibiting material is solid and is molded into an elongate structure which may be dropped, similar to a soap stick, into the well.

All of these prior art techniques for injecting corrosion inhibiting chemicals into a well have substantial disadvantages. For example, placing an additional string of macroni tubing in a well is obviously expensive and runs the additional risk of wrapping around the main production string so that it might become stuck. Pumping liquid chemicals into the well or allowing it to run down the inside of the tubing from the surface requires the use of a great quantity of chemical in order to coat the deepest portion of the well. The use of solid corrosion inhibiting material sticks also requires the use of a large amount of material Another problem with producing oil and/or gas wells which occurs in some areas is the buildup of scale inside the production string. Chemicals which are effective to remove scale are typically delivered into the well by pumping them down the production string. Typically, this requires the use of an excessive amount of chemical.

When pumping these descalers or corrosion inhibiting chemicals into a well, there is always a risk that the well may be damaged by pumping the extraneous materials into the formation. The productivity of some wells have been reduced significantly for reasons which are not wholly understood. This risk is always present but is more acute in low volume, low pressure gas wells which, though still profitable, are in the last stages of production. Like old people, these old wells are fragile and may die in circumstances that younger, more productive wells will survive without difficulty.

Another situation where it is desired to place a quantity of chemical at or near the bottom of a bore hole is the addition of an accelerator to cement. At present, all oil field cements have to be mixed at the surface and pumped through casing, tubing or drill pipe into the well. Consequently, the use of accelerator to hasten the setting of cement is limited to those accelerators which work fairly slowly since the accelerated cement slurry must be pumped down the well. It may be desirable, under certain circumstances, to deliver a quantity of liquid accelerator down the well and allow the accelerator to become mixed with the cement slurry in the bore hole. This is accomplished by selecting the carrier and the accelerator material in such a way that the accelerator dissolves the carrier. In this fashion, the accelerator may contact the cement slurry long after it is pumped into the well. Thus, accelerators which work much more rapidly may be employed Known disclosures of techniques for delivering a chemical into a well include U.S. Pat. Nos. 3,141,513 and 3,164,206.

This invention comprises a new technique for delivering liquid or liquid slurry chemical into a well in a simple, inexpensive and expeditious manner. The technique is particularly effective to deliver the chemical treating materials into the bottom of the well which is the hardest and least likely place where chemicals can be delivered. This is particularly desirable in situations where the problem to be treated by the liquid chemicals occurs at the bottom of the hole. Although the greatest amount of development work done to date involves the use of liquid corrosion inhibiting materials, it is already evident that this technique is suitable for the delivery of other chemicals, such as surfactants, descalers, accelerators and the like into a well or bore hole.

This invention comprises a new technique for delivering quantities of a liquid chemical into a well or bore hole. The chemical is poured into an elongate carrier at or near the well site. The liquid chemical and the carrier are selected so that the housing dissolves or is consumed by the liquid chemical in a fairly short period of time. The chemical-carrier assembly is accordingly dropped into the well almost immediately after the carrier is filled and sealed.

The liquid chemical-carrier falls into the well at a rate which depends on the comparable densities of the well fluid and the assembly as well as the aerodynamic properties of the carrier. Desirably, the carrier disintegrates shortly after it reaches the bottom of the well thereby releasing the chemical. Subsequent manipulations of the well depend to a considerable extent on the problem being treated and the chemical involved. In the case of corrosion inhibiting treatment, sufficient carriers or sticks are dropped into the well to deliver the desired quantity of corrosion inhibiting chemical into the well.

The well is allowed to sit for a short period of time and then is returned to production so that any liquid chemical accumulating in the bottom of the hole is moved upwardly. The corrosion inhibiting chemical inherently comes into contact with the internal wall of the production string and creates a film thereon which acts to inhibit corrosion of the metallic production string.

In summary, this invention comprises a technique for delivering a liquid chemical into a well or bore hole comprising the steps of pouring the liquid chemical into a carrier, dropping the carrier into the well and digesting the carrier with the liquid chemical to thereby release the liquid chemical into the well bore.

It is accordingly an object of this invention to provide a new and improved technique for delivering a liquid chemical into a well or bore hole.

Another object of this invention is to provide a technique for delivering a liquid chemical into the bottom of a well in an efficient, inexpensive and expeditious manner.

Other objects and advantages of this invention will become more fully apparent as this description proceeds, reference being made to the accompanying drawings and appended claims.

IN THE DRAWINGS

Figures 1, 2:
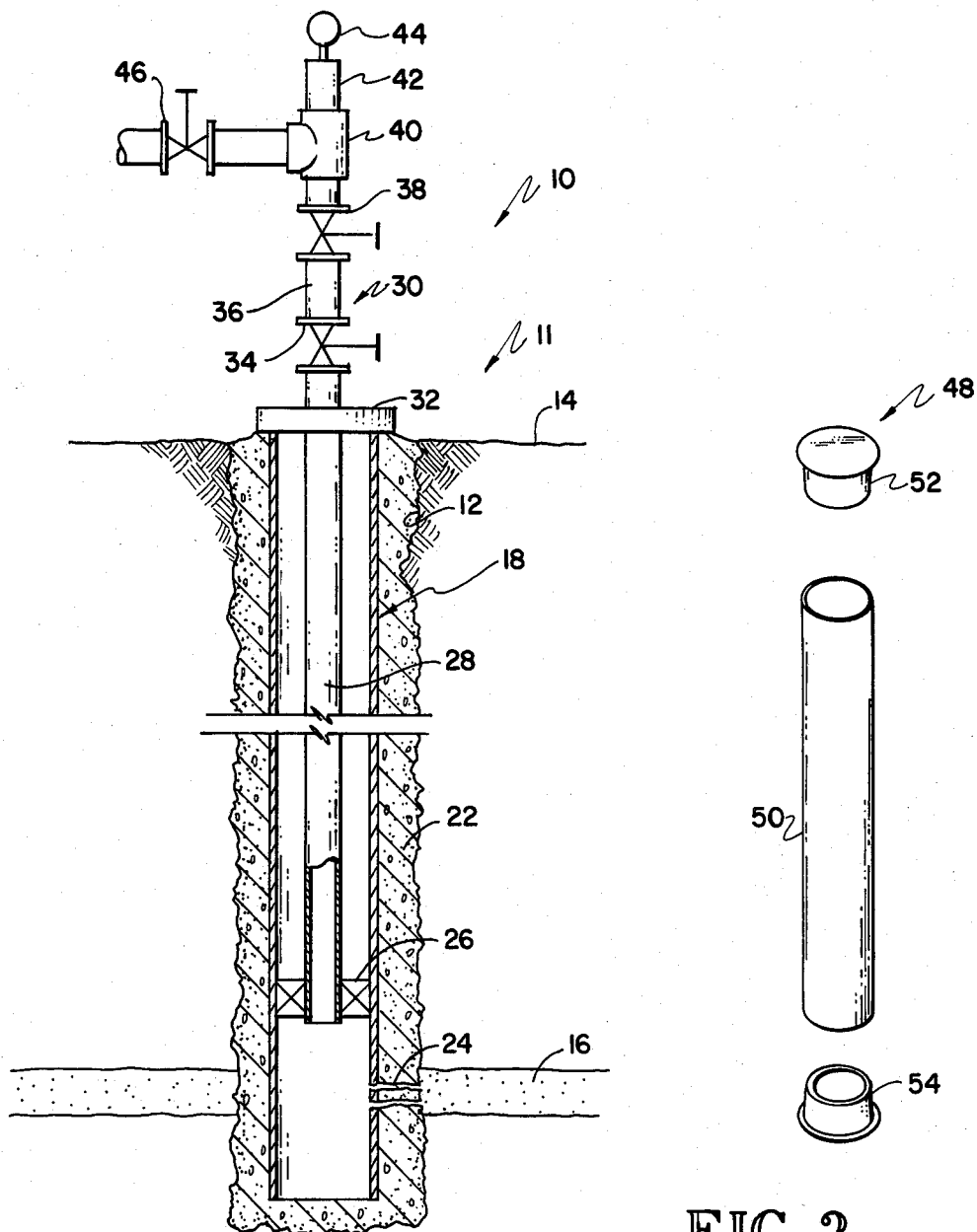
FIG. 1 is a longitudinal cross-sectional view of a typical well.
FIG. 2 is an exploded isometric view of a carrier of this invention.

Referring to FIG. 1, a typical producing well 10 located at a well site 11 includes a bore hole 12 drilled into the earth 14 to penetrate a zone 16 which is productive of oil or gas. A string of casing 18 is placed in the bore hole 12 and cemented therein by a sheath 22 of cement. A perforating gun (not shown) has been lowered inside the casing and energized to form a plurality of perforations 24 providing communication between the inside of the casing string 18 and the productive formation 16. A packer 26 and tubing string 28 have been lowered into the well 10 and manipulated to set the packer 26 to provide a seal between the tubing string 28 and the casing string 18. The tubing string 28 has been swabbed to bring the well in and allow the hydrocarbon fluids in the formation 16 to flow into the bottom of the well 10, up the tubing string and out of the Christmas tree 30. As will be evident to those skilled in the art, the Christmas tree 30 comprises a head or lower section 32 providing slips for suspending the tubing string 28 in the well 10 and a sealing mechanism to seal the annulus between the tubing string 28 and the casing 18. Above the head 32 is a lower master valve 34 which is connected by a short conduit 36 to an upper master valve 38. On top of the upper master valve 38 is a tee 40 having a tapped bull plug 42 having a gauge 44 screwed therein. A wing valve 46 is connected into another of the ports of the tee 40 and is typically connected to a choke cage as will be evident to those skilled in the art. It will be seen that the well 10 is a typical well productive of oil or gas.

The well site 11 will be recognizable to those skilled in the art. In the case of an offshore well, the well site 11 is the platform and its attached assembledges. In the case of an onshore well, the well site 11 is typically recognizable as the cleared and trafficked area near the well 10.

Such wells are periodically afflicted with problems which are treated by the delivery of chemicals into the well, hopefully at a location where the problem is occurring. As mentioned previously, one of these typical problems is the corrosion of the steel components of the well 10 as may be caused by produced formation fluid. A typical cause of such corrosion is carbon dioxide dissolved in the well fluids. The carbon dioxide attacks the steel components of the tubing string 28, and the packer 26 and casing string 18 below the packer 26. The extent or severity of corrosion is typically discovered and monitored by the analysis of water produced from the well 10, particularly by an analysis for iron in the produced water. It will be evident that large amounts of iron dissolved or suspended in the water produced from the well 10 is indicative of a rapid rate of corrosion of those well components which are in contact with formation fluids.

The technique of this invention comprises dropping a carrier 48 into the well 10 containing the liquid chemical material which is being used to treat a particular problem, such as corrosion. The chemical and the carrier are selected such that the carrier is digested, dissolved or consumed by the liquid chemical placed therein.

This peculiar relationship between the treating chemical and the carrier creates an article which had a very short shelf life, typically 5-60 minutes. The exact length of time required to dissolve the carrier and release the chemical is, of course, a function of the respective compositions, the temperature in the well bore, the solubility of the carrier in well fluids, and the wall thickness of the carrier. Some of these parameters are manifestly beyond the control of the persons responsible for treating the well 10. Fortunately, however, some of these parameters are subject to modification and selection in order to reduce or prolong the holding interval of the carrier. It will accordingly be evident to those skilled in the art that the holding interval allowed by the carrier 48 is subject to wide variation. It will, however, be likewise evident that the practicalities of well operations dictate that this interval be as short as reasonable in order to place a well back on production. Consequently, digestion times of greater than one day are theoretically possible but are not practically desirable since no operator wants a well to be off production for so long a time unless it is absolutely necessary.

The very short shelf life of the chemical-carrier assembly dictates that the carrier be filled at or very near the well site. Typically, the person treating the well pours the liquid chemical into the carrier at the well site, seals the carrier and then almost immediately drops the carrier into the well. The length of time it takes for the carrier to reach the bottom of the well depends on a variety of factors which will be well understood by those skilled in the art. The depth of the well, the density of the fluid in the well, the density of the chemical-carrier assembly and the aerodynamic properties of the housing will all be seen to affect the time required for the carrier to reach the bottom of the well. It is not presently known how fast the presently used chemical-carrier assemblies fall through a gas filled 2⅜" or 2⅞" tubing string. It is presently suspected, however, that the terminal velocity is somewhere in the range of 25-75 ft/sec. Thus, it is surmised that it does not take more than a few minutes for the carrier to reach the bottom of a 7000 foot gas well. Thus, very short digestion times of the housing are both practical and quite desirable.

The peculiar relationship between the carrier and the liquid chemical, i.e. the former is digested by the latter, has several interesting advantages. In contrast to the situation where soap stick carriers are dissolved by water in the well, there are corrosion and scale problems which occur in wells which do not make water. By selecting the carrier in the liquid chemical so that the carrier digests in the chemical, the particular combination of carrier and chemical selected will work in any well regardless of whether the carrier is soluble or insoluble in well fluids. Another interested aspect is evident in treating scale. Scale buildup on the inside of a tubing string obviously decreases the internal tubing diameter. Thus, a carrier of known diameter will fall through the tubing string until it reaches a location where the internal tubing diameter is obstructed, i.e. there is a scale build up. Thus, the carrier stops at exactly the location where it is desired to release the liquid chemical descaler. In contrast, if one were to use a water soluble but descaler insoluble carrier, the carrier may stop downward movement at an area of scale build-up up the hole out of the water in the well. Thus, the carrier would merely comprise an obstruction in the tubing since the carrier would not be digested to release the chemical.

For use in the conventional oil and gas producing wells, the carrier 48 should be of elongate generally cylindrical construction in order to pass readily through the production string. A convenient construction is shown in FIG. 2 where the carrier 48 comprises a central tubular section 50 closed by suitable end caps 52, 54. The tubular section 50 is desirably made by extruding the desired material into long lengths of cylindrical shape and then cutting the lengths to size. The end caps 52, 54 are conveniently cast or injection molded.

The carrier 48 should have sufficient physical strength to withstand a modest amount of physical abuse as will occur when the carrier 46 is dropped down the tubing string 28. Those skilled in the art will appreciate that the carrier 46 will bounce off of the interior wall of the tubing string 28 during its downward passage to the bottom of the well 10. Similarly, the carrier 46 should have sufficient physical strength to prevent chemical leakage from bursting of the central tubular section 50.

The material from which the carrier 48 is made obviously depends, in large measure, on the nature of the chemical placed therein. In the corrosion inhibiting application to which this invention has been put, a carrier substantially as shown in FIG. 2 is available from Aqua-Flow, Inc. of Nitro, West Virginia. This carrier is about 18" long and 1¼" OD with a wall thickness of about 1/20" thereby having a capacity of about 22 cubic inches. This carrier is presently believed to be made of polyvinyl alcohol and has proved imminently satisfactory as a carrier for a corrosion inhibitor available from VariChem, Inc. of Old Ocean, Texas, which is designated C-1370 by the manufacturer. This corrosion inhibitor digests the carrier made by Aqua-Flow in a few minutes at room temperature. Manifestly, the dissolution of the carrier 48 speeds up at increasing temperatures which are found in any well extending any substantial depth into the earth. Accordingly, dissolution times are somewhat greater than that observed at the surface. In order to drop the carrier 48 into the well 10, the upper and lower master valve 38, 34 are closed and the bull plug 42 is removed. The carrier 48 is dropped into the Christmas tree 30 and the upper master valve 38 is opened. The carrier 48 accordingly falls on top of the lower master valve 34. The upper master valve 38 is closed and the lower master valve 34 is opened. The carrier 48 accordingly falls by gravity through the tubing string 28 into the well 10. The lower master valve 34 is closed and the bull plug 42 is replaced. After a sufficient length of time elapses for the carrier 48 to reach the bottom of the well 10 and for the chemical therein to disintegrate the carrier 48, the well 10 is placed back on production.

Figure 3:
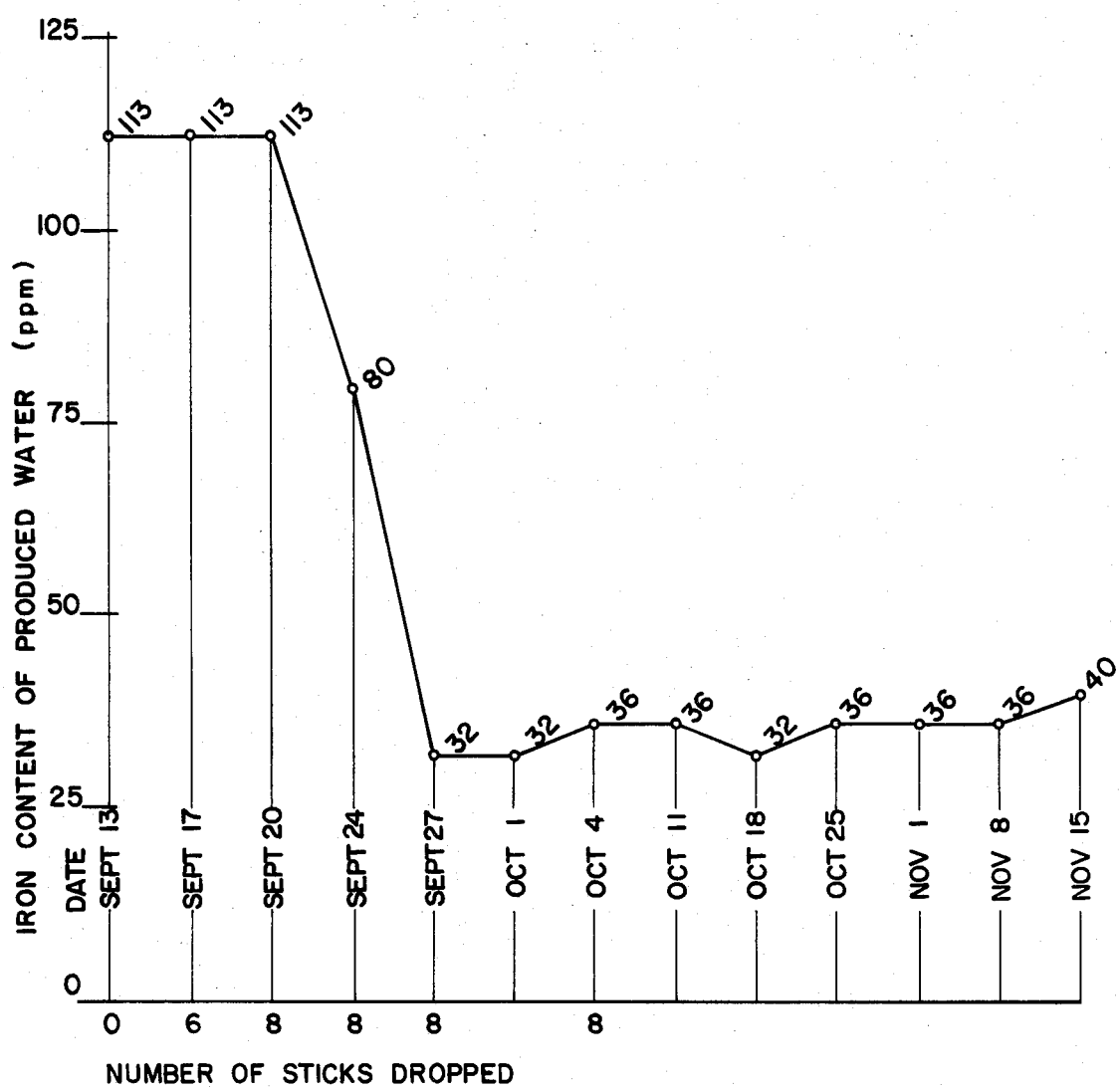
FIG. 3 is a graph illustrating the effect of treating a well with a corrosion inhibiting material in accordance with the technique of this invention.

The effectiveness of the technique of this invention is shown in FIG. 3 which is a chart generated during treatment of a gas lifted oil well near Freer, Texas. This well is completed at about 6200 feet and produced, during the duration of the test, about 100 barrels of oil per day and 686 barrels of water per day. The produced fluids had a surface temperature of 200° F. As shown in the left of FIG. 3, the initial, untreated iron content of the produced water was 113 parts per million. It will accordingly be seen that the total quantity of iron produced per day from this well, before treatment, was:

113 ppm × 686 bbls water × 42 gals/bbl × 9 lbs/gal = 29.3 lbs of iron per day.

How much of this produced iron is from formation water and how much of it constitutes iron corroded off of the pipe, packer and the like which are in the well is not known to a moral certainty. Obviously, a substantial amount of this iron is out of the metallic components in the well bore. Iron production of 29 pounds a day is serious, considering 2⅜ inch tubing weighs 4.6 pounds per foot.

Treatment of the well depicted in FIG. 3 began on Sept. 17 when six sticks 48 were dropped in the well. Three days later, on Sept. 20, no change had occurred in the quantity of produced iron and eight sticks of corrosion inhibiting material were dropped in the well. Four days later, on Sept. 24, the iron content had dropped to 80 parts per million. On Sept. 27, iron content had dropped to 32 parts per million. The last treatment of this well, during the test period, occurred on Oct. 4 when eight more sticks were dropped in the well. It will be seen that the iron content of the produced water dropped, during the test period, from 113 parts per million to an average of about 35 parts per million. It is quite clear that this production of produced iron is a reduction in corrosion occurring in the well, as opposed to a reduction of iron content in formation water. Accordingly, the treatment in accordance with this invention caused a reduction of produced iron in this well of 78 parts per million which corresponds to a reduction of produced iron by 20.2 pounds per day. Since this reduction of 20.2 pounds per day is a reduction in the loss of the innards of this well, it will be evident that the treatment was dramatically effective.

The test well depicted in FIG. 3 was not treated, during the test period, from Oct. 4 through Nov. 15. During this five week period, the iron content of the produced water increased only slightly. This is a testimony to the effectiveness of the corrosion inhibiting chemicals used since the film created thereby apparently adherred to the metallic surfaces of the exposed part of the well in a remarkable fashion. Considering that 41 days elapsed between October 4 and November 15, and an average water production of 686 barrels a day, this adds up to about 1.2 million gallons of water moving upwardly through the well. From the results shown in FIG. 3, even this tremendous quantity of water did not dislodge the corrosion inhibiting film created by the technique of this invention.

As mentioned previously, this technique is also quite suitable for the delivery of chemical descalers into a well. Most scales found in oil and gas wells are either acid soluble or are attacked by acid. Typical scales are magnesium carbonate, calcium carbonate and mixtures thereof. In accordance with this invention, a sleeve or carrier is made of an acid soluble material such as cellulose acetate. The acid soluble carrier is conveniently manufactured as shown in FIG. 2 to carry a quantity of hydrochloric acid.

If it is desired to treat the well 10 with an acid descaler, the acid soluble stick is filled with the acid at the well site 11 and then substantially immediately dropped into the well.

Although the invention has been described in its preferred forms with a certain degree of particularity, it is understood that the present disclosure is only by way of example and that numerous changes in the details of construction and in the combination and arrangement of parts may be resorted to without departing from the spirit and scope of the invention as hereinafter claimed.

I claim:

1. A technique for placing a liquid chemical into a well penetrating the earth, comprising
    pouring the chemical into a carrier digestible by the chemical;
    dropping the carrier into the well and moving the carrier toward the bottom of the well; and
    generating a hole in the carrier, while inside the well, by digesting the carrier to a substantial extent from the inside out with the chemical allowing the liquid chemical to escape from the carrier into the well.

2. The technique of claim 1 wherein the well is located at a well site and the pouring step is conducted at the well site from a container which is not disintegrated by the chemical.

3. The technique of claim 2 wherein the carrier disintegrates in less than about two hours.

4. The technique of claim 3 wherein the carrier disintegrates in less than about twenty minutes.

5. The technique of claim 2 wherein the carrier is of a material which dissolves in the liquid chemical.

6. The technique of claim 2 wherein the liquid chemical is a corrosion inhibitor.

7. The technique of claim 2 wherein the liquid chemical is a descaler.

8. The technique of claim 2 wherein the liquid chemical is a surfactant.

9. The technique of claim 2 wherein the liquid chemical is a cement setting accelerator.

10. The technique of claim 2 wherein the moving step allowing the carrier to gravitate toward the bottom of the well.

11. A technique for placing a liquid chemical into a metallic vessel, comprising
    pouring the chemical into a carrier digestible by the chemical;
    dropping the carrier into the vessel and gravitationally moving the carrier toward the bottom of the vessel; and
    generating a hole in the carrier, while inside the vessel, by digesting the carrier to a substantial extent from the inside out with the chemical and allowing the liquid chemical to escape from the carrier into the vessel.

12. A well treating assembly comprising a container having a longitudinal dimension and a transverse dimension, the transverse dimension being substantially less than the longitudinal dimension and being sufficiently small to pass into oil field tubular goods and a liquid chemical in the container, the container being digestible in the liquid chemical to release the liquid chemical in a time period less than two hours at ambient temperature and pressure.

13. The well treating assembly of claim 12 wherein the liquid chemical is corrosion inhibitor.

14. The well treating assembly of claim 12 wherein the liquid chemical is acid.

15. The well treating assembly of claim 12 wherein the liquid chemical is descaler.

16. The well treating assembly of claim 12 wherein the liquid chemical is surfactant.

17. The well treating assembly of claim 12 wherein the time period is 5–60 minutes.

* * * * *